(12) United States Patent
Kordel et al.

(10) Patent No.: US 9,533,603 B2
(45) Date of Patent: Jan. 3, 2017

(54) SEAT OCCUPANCY SENSOR UNIT AT A LOWER B-SURFACE SIDE OF A SEAT CUSHION

(71) Applicant: IEE INTERNATIONAL ELECTRONICS & ENGINEERING S.A., Echternach (LU)

(72) Inventors: Markus Kordel, Trier (DE); Dietmar Jungen, Mehren (DE); Konstantin Weires, Kruchten (DE); Manuel Wampach, Junglinster (LU)

(73) Assignee: IEE International Electronics & Engineering S.A., Echternach (LU)

( * ) Notice: Subject to any disclaimer, the term of this patent is extended or adjusted under 35 U.S.C. 154(b) by 0 days.

(21) Appl. No.: 14/443,967

(22) PCT Filed: Nov. 5, 2013

(86) PCT No.: PCT/EP2013/073033
§ 371 (c)(1),
(2) Date: May 19, 2015

(87) PCT Pub. No.: WO2014/075953
PCT Pub. Date: May 22, 2014

(65) Prior Publication Data
US 2015/0283923 A1 Oct. 8, 2015

(30) Foreign Application Priority Data

Nov. 19, 2012 (LU) .......................................... 92100

(51) Int. Cl.
*G08B 21/00* (2006.01)
*B60N 2/00* (2006.01)
(Continued)

(52) U.S. Cl.
CPC ............. *B60N 2/002* (2013.01); *B60N 2/7094*
(2013.01); *B60R 21/01516* (2014.10); *B60R 21/01526* (2014.10); *A61G 2005/1091* (2013.01)

(58) Field of Classification Search
CPC . B60N 2/002; B60R 21/015; B60R 21/01516; B60R 21/01526; A61G 2005/1091
(Continued)

(56) References Cited

U.S. PATENT DOCUMENTS 4,796,013 A * 1/1989 Yasuda .................. G01V 3/088
180/272
5,232,243 A * 8/1993 Blackburn ............. B60N 2/002
180/273
(Continued)

FOREIGN PATENT DOCUMENTS

DE 19752976 A1 6/1998
DE 202010003563 U1 8/2010
(Continued)

OTHER PUBLICATIONS

International Search Report and Written Opinion issued Feb. 6, 2014 re: Application No. PCT/EP2013/073033; citing: JP 2011 105278 A and EP 2 492 137 A2.

*Primary Examiner* — John A Tweel, Jr.
(74) *Attorney, Agent, or Firm* — Reising Ethington P.C.

(57) ABSTRACT

A B-surface seat occupancy sensor unit (10) comprises a support plate (12) having a top surface (20) and a bottom surface, a plurality of spacer elements (14), which define an upper surface (18) of the unit. The top surface of the support plate is arranged recessed the upper surface. A first foam pad (22) is disposed between the spacer elements on the support plate. A recess (24) formed in the top surface of the support plate, underneath the first foam pad, accommodates a second foam pad (23) carrying a pressure-responsive membrane switch (26). The recess has a depth exceeding the total height of the pressure-responsive membrane switch and the (Continued)

second foam pad. The pressure-sensitive membrane switch projects laterally beyond opposite edges of the second foam pad.

16 Claims, 3 Drawing Sheets

(51) Int. Cl.
    *B60R 21/015* (2006.01)
    *B60N 2/70* (2006.01)
    *A61G 5/10* (2006.01)

(58) Field of Classification Search
    USPC .................. 340/667; 180/273; 297/217.3
    See application file for complete search history.

(56) References Cited

U.S. PATENT DOCUMENTS

| | | | | |
|---|---|---|---|---|
| 5,570,903 | A * | 11/1996 | Meister | B60N 2/002<br>180/273 |
| 5,739,757 | A * | 4/1998 | Gioutsos | B60K 28/04<br>340/667 |
| 6,479,766 | B2 * | 11/2002 | Gray | B60N 2/002<br>280/735 |
| 6,555,766 | B2 * | 4/2003 | Breed | G01G 19/4142<br>180/273 |
| 6,840,117 | B2 * | 1/2005 | Hubbard, Jr. | A43B 3/00<br>177/144 |
| 7,860,625 | B2 * | 12/2010 | Jaramillo | B60N 2/002<br>180/273 |
| 2014/0246887 | A1 * | 9/2014 | Clos | B60N 2/002<br>297/217.3 |
| 2015/0143927 | A1 * | 5/2015 | Goedert | B60N 2/7094<br>73/862.641 |
| 2015/0283922 | A1 * | 10/2015 | Kordel | B60N 2/7094<br>297/217.3 |

FOREIGN PATENT DOCUMENTS

| | | |
|---|---|---|
| EP | 2492137 A2 | 8/2012 |
| JP | 2011105278 A | 6/2011 |

* cited by examiner

SEAT OCCUPANCY SENSOR UNIT AT A LOWER B-SURFACE SIDE OF A SEAT CUSHION

TECHNICAL FIELD

The present invention generally relates to sensing the occupancy state of a vehicle seat. Specifically, the invention relates to a pressure-responsive seat occupancy sensor unit for being placed on the bottom side of a seat cushion; i.e. between the seat cushion and the cushion-supporting means such as, e.g. a seat pan, springs etc.

BACKGROUND ART

Seat occupancy sensors are nowadays widely used in automotive vehicles to provide a seat occupancy signal for various appliances, such as, e.g. a seat belt reminder, an auxiliary restraint system (airbag), etc. Seat occupancy sensors exist in a number of variants, e.g. based on capacitive sensing, deformation sensing or pressure (force) sensing. Pressure-sensitive seat occupancy sensors have typically been arranged between the foam body of the seat cushion and the seat cover.

The possibility of customization and personalization of the vehicle by the customer is a key selling factor of modern cars. This leads to many different variants of car interiors being offered for one car model. With the increasing number of available options, severe constraints arise concerning the implementation of technical equipment in the vehicle. With seat occupancy sensors arranged between the foam body of the seat cushion and the seat cover, every seat design (leather, cloth, sport, comfort, . . . ) requires specific development effort for the occupant detection system. That induces high development costs and therefore is an unattractive solution for the automotive industry. A problem to be solved is, therefore, to find a sensor solution, which is less influenced by seat design and thus can be used for a greater variety of car seats or even car platforms.

Document DE 197 52 976 A1 discloses a vehicle seat occupancy sensor in the shape of a film-type pressure sensor. The pressure sensor includes a first carrier film, a spacer and a second carrier film, which are disposed on one another in the manner of a sandwich. Contact elements are arranged on the inner surfaces of the carrier films. An opening in the spacer allows the contact elements to get into contact with each other when pressure is applied on the sensor. The pressure sensor is arranged inside a cavity on the bottom side of the foam cushion of the vehicle seat. The pressure sensor is supported by a foam block, which closes the cavity and which rests on the seat pan.

Document DE 20 2010 003 563 U1 discloses a pressure-sensor unit, comprising a film-type pressure sensor. The pressure sensor includes two films maintained at a distance by a spacer material arranged there between. The pressure sensor is disposed on a compressible intermediate layer, which is, in turn arranged on a base plate.

With pressure sensor units arranged on the B-surface of the seat cushion (i.e. on the side facing away from that on which an occupant may seat himself, between the seat cushion and the support thereof), the seat cushion transfers the pressure from the seating surface to the pressure sensor unit. As a matter of fact, the padding of the seat cushion becomes part of the measurement unit. Whereas the production tolerances of film-type pressure sensors may be controlled such that a uniform activation pressure threshold (i.e. the pressure, at which the films of the pressure sensor get into contact with each other) is achieved for the whole production, important investments would be necessary in the seat manufacturers' production in order to guarantee that the foam of every seat cushion has exactly the same thickness and behaves the same way under pressure, in particular, transfers the same amount of pressure to the pressure-sensor unit.

BRIEF SUMMARY

The invention provides a pressure-responsive B-surface seat occupancy sensor unit compatible with the production tolerances of vehicle seats.

A B-surface seat occupancy sensor unit for detecting an occupancy state of a seat, e.g. a vehicle seat, according to a first aspect of the invention is configured for seats wherein the cushion is supported by springs. Such B-surface seat occupancy sensor unit comprises a support plate having a top surface and a bottom surface, a plurality of bearing elements for fixation of the support plate on seat cushion suspension springs, the bearing elements defining an upper surface of the B-surface seat occupancy sensor unit, which the top surface of the support plate is arranged recessed from, a first foam pad disposed between the bearing elements on the support plate, a recess formed in the top surface of the support plate, underneath the first foam pad, a second foam pad arranged in the recess, a pressure-responsive membrane switch arranged in the recess on the second foam pad. The recess has a depth exceeding the total height of the pressure-responsive membrane switch and the second foam pad. The pressure-sensitive membrane switch projects laterally beyond a first edge of the second foam pad and beyond a second edge of the second foam pad, opposite the first edge.

Preferably, the bearing elements are integrally formed with the support plate. The bearing elements and the support plate can be made from any suitable material. Preferably, however, they are made from injection-molded plastic.

According to a second aspect of the invention, the B-surface seat occupancy sensor unit is configured for seats, wherein the cushion is supported by a seat pan (e.g. made from sheet metal or from plastic). The B-surface seat occupancy sensor unit for detecting an occupancy state of a seat according to the second aspect of the invention comprises a support plate having a top surface and a bottom surface, a plurality of spacer elements defining an upper surface of the B-surface seat occupancy sensor unit from which upper surface the top surface of the support plate is arranged recessed from, a first foam pad disposed between the spacer elements, carried by the support plate, a recess formed in the top surface of the support plate, underneath the first foam pad, a second foam pad arranged in the recess and a pressure-responsive membrane switch arranged in the recess on the second foam pad. The recess has a depth exceeding the total height of the pressure-responsive membrane switch and the second foam pad. The pressure-sensitive membrane switch projects laterally beyond a first edge of the second foam pad and beyond a second edge of the second foam pad, opposite the first edge.

Preferably, the spacer elements are integrally formed with the support plate. The support plate and the spacer elements are preferably made from injection-molded plastic, although other materials may prove suitable.

The B-surface membrane switch in accordance with the first and the second aspect of the invention comprises a first carrier film and a second carrier film spaced from each other by a spacer film, the spacer film having therein an opening defining a cell, the pressure-responsive membrane switch comprising at least two electrodes arranged in facing relationship with each other in the cell on the first and the second carrier film, respectively, in such a way that they are brought closer together, possibly into contact with each other, when pressure is applied on the pressure-responsive membrane switch. When a contact between the electrodes on the first and second carrier film is established, one speaks of "activation" of the membrane switch. The minimum amount of pressure at which the contact is established is called the "pressure threshold" or the "activation threshold".

The first foam pad is configured such that, upon it being compressed by application of pressure exceeding a certain threshold, it deforms so as to penetrate into the recess, contacts the pressure-responsive membrane switch, and, together with the second foam pad, squeezes the pressure-responsive membrane switch so as to activate it. Due to the fact that the membrane switch projects laterally beyond two opposite edges of the second foam pad, at higher pressures, the first foam pad bends down the projecting portions of the pressure-responsive membrane switch, causing the membrane switch to camber. The membrane switch is thus activated through a combination of compression and bending (cambering). Experiments have shown that the additional parameter of the camber allows achieving a more precise definition of the activation threshold over broad temperature ranges (e.g. from −40° C. to 85° C.).

As will be appreciated, due to the depth of the recess greater than the total height of the pressure-responsive membrane switch and the second foam pad, there is an air gap between the pressure-responsive membrane switch and the bottom of the first foam pad when the seat is in unloaded condition. The air gap thus prevents a so-called pre-loading of the pressure-responsive membrane switch. Furthermore, if the foam pad deforms due to ageing and begins sinking into the gap, it will not immediately apply a pre-load on the membrane switch. Accordingly, a longer lifetime of the unit may be obtained.

A further aspect of the invention relates to a vehicle seat, comprising a seat cushion supported by cushion-supporting springs and a B-surface seat occupancy sensor unit according to the first aspect of the invention. The B-surface seat occupancy sensor unit rests on the cushion-supporting springs and is applied by the cushion-supporting springs against the seat cushion.

Yet a further aspect of the invention relates to a vehicle seat, comprising a seat cushion supported by a cushion-supporting pan and a B-surface seat occupancy sensor unit in accordance with the second aspect of the invention. The B-surface seat occupancy sensor unit in this case rests on the cushion-supporting pan and is applied by the cushion-supporting pan against the seat cushion.

When the seat is loaded (by an occupant), the seat foam is compressed and transfers a part of the pressure to the foam pad of the seat occupancy sensor unit. In turn, the foam pad deforms and penetrates into the recess. If the pressure transferred to the pressure-responsive membrane switch exceeds the pressure threshold, the latter is activated and the occupancy of the seat is recognized.

As will be appreciated, the sensitivity of the seat occupancy sensor unit depends on and may thus be adjusted by at least the following parameters:

Height and hardness of the first and second foam pads;
Height of the gap between the first foam pad and the pressure-responsive membrane switch;
Activation threshold of the membrane switch;
The size (diameter) of the recess in relation to the supported area of the foam pad;
The size (diameter) of the membrane switch and the distance between the opposite edges of the second foam pad.

BRIEF DESCRIPTION OF THE DRAWINGS

Preferred embodiments of the invention will now be described, by way of example, with reference to the accompanying drawings in which.

DESCRIPTION OF PREFERRED EMBODIMENTS

Figure 1:
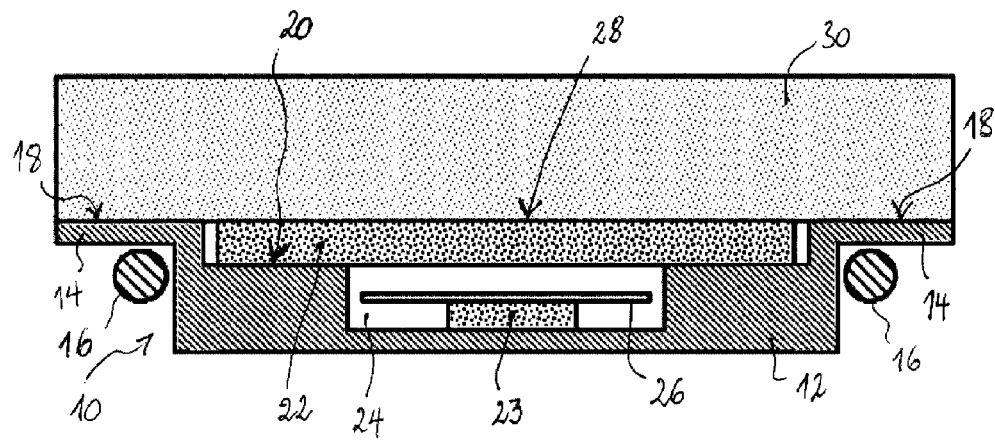
FIG. 1 is a cross sectional view of a pressure-responsive seat occupancy sensor unit according to the first aspect of the invention.
Figure 2:
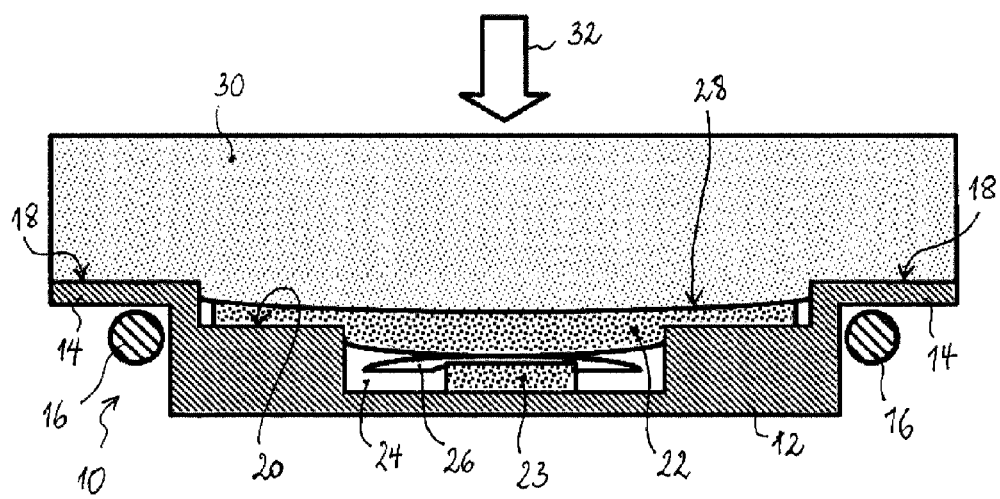
FIG. 2 shows the pressure-responsive seat occupancy sensor unit of FIG. 1 when the seat, which it is arranged in, is occupied.

FIGS. 1 to 5 show a pressure-responsive B-surface seat occupancy sensor unit 10 for a vehicle seat according to a preferred embodiment of the first aspect of invention. The occupancy sensor unit 10 comprises a support plate 12 which is integrally formed with lateral bearing elements 14, by which the support plate is attached to the cushion-supporting springs 16 of the seat. The bearing elements 14 define an upper surface 18 of the occupancy sensor unit, from which upper surface 18 the top surface 20 of the support plate 12 is arranged recessed. A first foam pad 22 is disposed between the bearing elements 14 on the top surface 20 of the support plate 12. A recess 24 formed in the top surface 20 of the support plate 12, underneath the foam pad 22, accommodates a pressure-responsive membrane switch 26 placed on a second foam pad 23. The depth of the recess 24 exceeds the total height of the membrane switch 26 and the second foam pad 23.

The upper surface 28 of the foam pad 22 is substantially in alignment with the upper surface 18 of the occupancy sensor unit 10. Both surfaces are thus applied against the bottom side (B-surface) of the seat cushion 30. When the seat is loaded (illustrated in FIG. 2 by arrow 32), the seat cushion 30 transfers part of the resulting pressure onto the occupancy sensing unit 10, in particular onto the first foam pad 22. The mechanical properties of the first foam pad 22 are chosen such that, when the foam pad 22 is compressed by application of pressure exceeding a certain threshold, it deforms so as to penetrate into the recess 24 in the top surface of the support plate 12, contacts the pressure-responsive membrane switch 26, makes pressure-responsive membrane switch 26 camber (FIG. 2) and, together with the second foam pad 23, compresses the pressure-responsive membrane switch 26, whereby the latter is activated.

Figure 3:
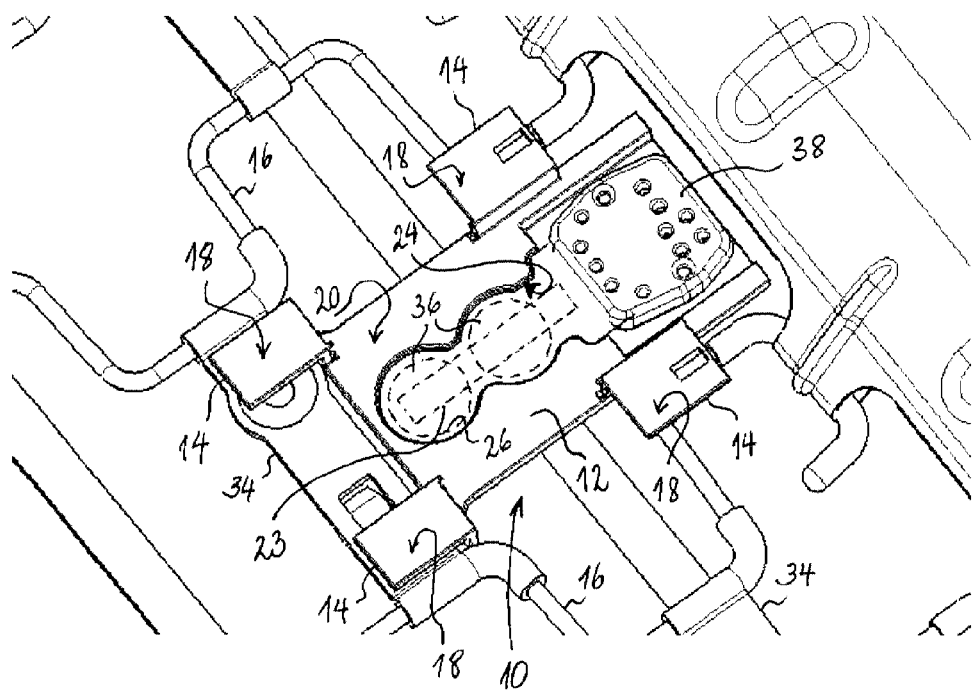
FIG. 3 is a perspective view of the pressure-responsive seat occupancy sensor unit of FIG. 1 without the foam pad.

FIG. 3 shows the occupancy sensing unit 10 from a different perspective. The foam pad 22 and the seat cushion are not shown in FIG. 3 for sake of clarity. The lateral bearing elements 14 rest upon the cushion-suspension mat formed by the springs 16 and the cross-ties 34. The support plate 12, which is in recess from the upper surface 18 of the occupancy sensing unit 10 carries a sensor device with two active areas 36, each of which represents a pressure-responsive membrane switch 26. Both membrane switches are electrically linked to a connection tail, which is protected by a hot-melt casing 38. The connection tail serves to interface the sensor device with read-out electronics (such as e.g. a car's onboard computer). The position and the shape of the second foam pad 23, which is located underneath the sensor device, are indicated in FIG. 3 by a dashed contour. Each of the membrane switches projects laterally beyond the mutually opposite long edges of the second foam pad 23. It is worthwhile noting that the sensor device and thus the membrane switches 26 are maintained in place by the contour of the recess 24 fitting the contour of the sensor device and by the hot-melt casing. In order to avoid strain on the membrane switches 26 while the first foam pad 22 is not in contact with them, the sensor device is not glued or otherwise attached to the second foam pad 23 but merely lies on it. The construction of the occupancy sensing unit 10 thus allows for minute relative movement between the sensor device and the second foam pad, which largely avoids strain on the membrane switches 26 caused by different thermal expansion coefficients of the components of the occupancy sensing unit 10.

Figure 4:
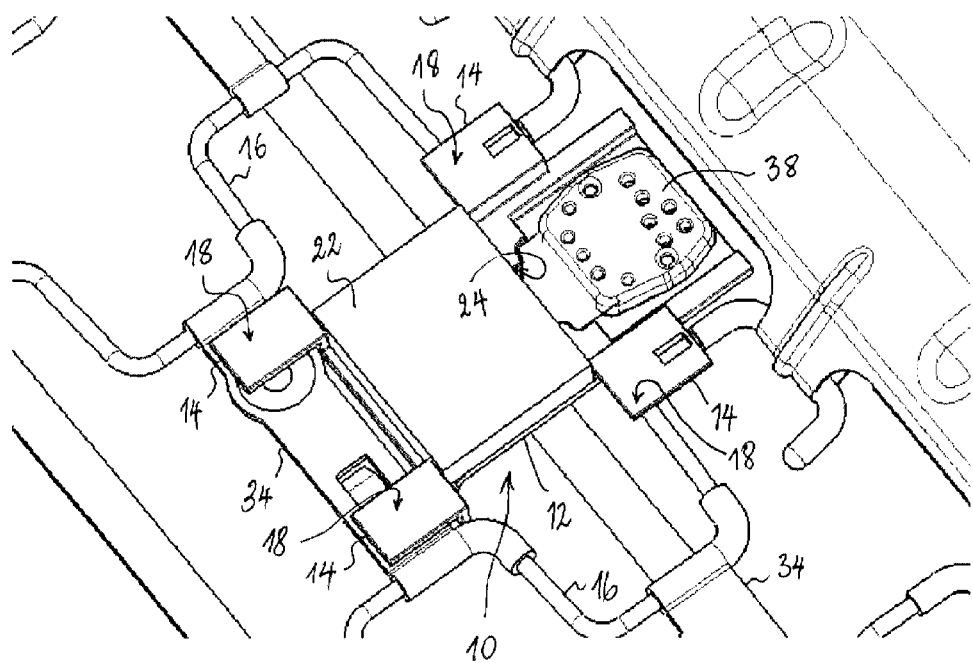
FIG. 4 is a perspective view of the pressure-responsive seat occupancy sensor unit of FIG. 1 wherein the foam pad is shown.

FIG. 4 shows the same perspective as FIG. 3, with the foam pad 22 in place.

Figure 5:
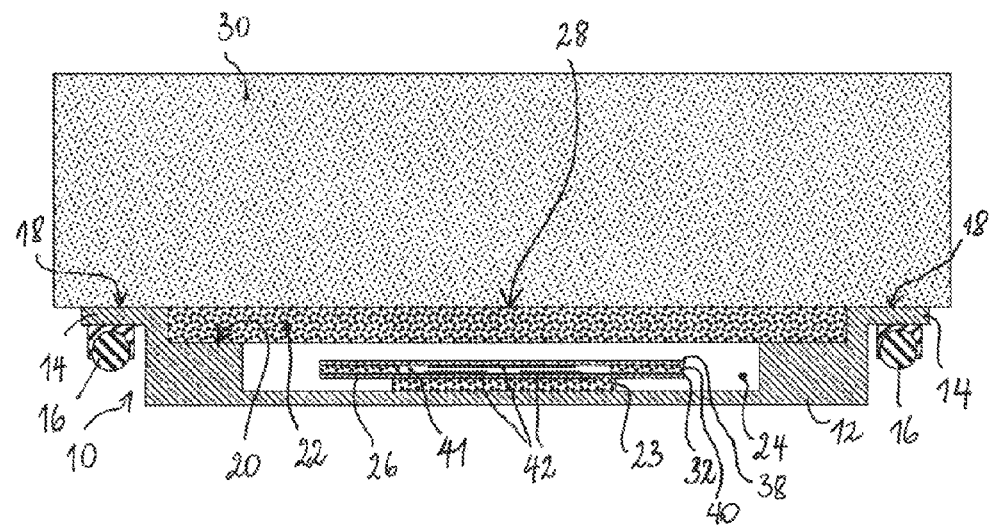
FIG. 5 is a cross sectional view of a pressure-responsive seat occupancy sensor unit of FIG. 1 showing the inner structure of the pressure-responsive membrane switch.

FIG. 5 corresponds to FIG. 1, except that it also shows the inner structure of the pressure-responsive membrane switch 26. As can be seen, the pressure-responsive membrane switch 26 comprises a first carrier film 32 and a second carrier film 38 spaced from each other and held together by a spacer film 40. The spacer film 40 has an opening (41) therein that defines a cell. At least two electrodes 42 are arranged in facing relationship with each other in the cell on the first and the second carrier film, respectively. When pressure is applied on the pressure-responsive membrane switch 26 by the first and second foam pads 22, 23, the carrier films 32, 38 camber and inflect and the electrodes 42 are thus brought closer together. If sufficient pressure is applied, i.e. a pressure exceeding the activation threshold, the electrodes 42 get into contact with each other, whereby an electrical circuit is closed. This results in a drop in electrical resistance or voltage or in an increase in current, which may be detected by an associated control and evaluation circuit.

Figure 6:
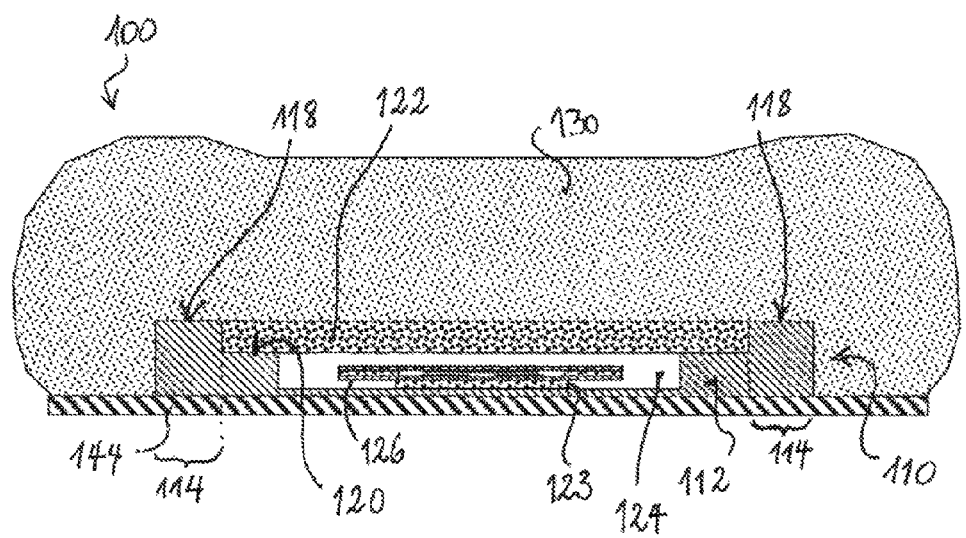
FIG. 6 is a cross sectional view of a pressure-responsive seat occupancy sensor unit according to the second aspect of the invention.

FIG. 6 illustrates a preferred embodiment of a B-surface seat occupancy sensor unit 110 according to a second variant of the invention, integrated into the seating portion of a vehicle seat 100. The vehicle seat comprises a seat pan 144, which supports the seat cushion 130. The occupancy sensor unit 110 rests upon the seat pan 144.

The B-surface seat occupancy sensor unit 110 comprises a support plate 112, a plurality of spacer elements 114 defining an upper surface 118 of the seat occupancy sensor unit 110, from which upper surface 118 the top surface 120 of the support plate 112 is arranged recessed from. A first foam pad 122 is disposed between the spacer elements 114, carried by the support plate 112. A recess 124 formed in the top surface 120 of the support plate 112, underneath the first foam pad 122, accommodates a pressure-responsive membrane switch 126 arranged on a second foam pad 123. The recess 124 has a depth exceeding the total height of the membrane switch 126 and the second foam pad 123. The mechanical properties of the first foam pad 122 are chosen such that, when the foam pad 122 is compressed by application of pressure exceeding a certain threshold, it deforms so as to penetrate into the recess 124 in the top surface of the support plate 112, contacts the pressure-responsive membrane switch 126, makes pressure-responsive membrane switch 126 camber and, together with the second foam pad 123, compresses the pressure-responsive membrane switch 126, whereby the latter is activated.

The inner construction of the pressure-responsive membrane switch 126 is the same as that of the pressure-responsive membrane switch 26, discussed with respect to FIG. 5.

While specific embodiments have been described in detail, those skilled in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

The invention claimed is:

1. A B-surface seat occupancy sensor unit for detecting an occupancy state of a seat, comprising
    a support plate having a top surface and a bottom surface,
    a plurality of bearing elements for fixation of said support plate on seat cushion suspension springs, said bearing elements defining an upper surface of said B-surface seat occupancy sensor unit, which said top surface of said support plate is arranged recessed from;
    a first foam pad disposed between said bearing elements on said support plate;
    a recess formed in said top surface of said support plate, underneath said first foam pad;
    a second foam pad arranged in said recess;
    a pressure-responsive membrane switch arranged in said recess on said second foam pad, said pressure-responsive membrane switch comprising a first carrier film and a second carrier film spaced from each other by a spacer film, said spacer film having therein an opening defining a cell, said pressure-responsive membrane switch comprising at least two electrodes arranged in facing relationship with each other in said cell on said first and said second carrier film, respectively, in such a way that they are brought closer together, possibly into contact with each other, when pressure is applied on said pressure-responsive membrane switch;
    wherein said recess has a depth exceeding the total height of said pressure-responsive membrane switch and said second foam pad; and
    wherein said pressure-sensitive membrane switch projects laterally beyond a first edge of said second foam pad and beyond a second edge of said second foam pad, opposite said first edge.

2. The B-surface seat occupancy sensor unit as claimed in claim 1, wherein said bearing elements are integrally formed with said support plate.

3. The B-surface seat occupancy sensor unit as claimed in claim 2, wherein said support plate and said bearing elements are made of injection-molded plastic.

4. The B-surface seat occupancy sensor unit as claimed in claim 1, wherein said first foam pad is configured such that, upon it being compressed by application of pressure exceeding a certain threshold, it deforms so as to penetrate into said recess, contacts said pressure-responsive membrane switch, and, together with said second foam pad, squeezes said pressure-responsive membrane switch so as to activate it.

5. A vehicle seat, comprising a seat cushion supported by cushion-supporting springs and a B-surface seat occupancy sensor unit for detecting an occupancy state of a seat, said B-surface seat occupancy sensor unit comprising
a support plate having a top surface and a bottom surface,
a plurality of bearing elements for fixation of said support plate on seat cushion suspension springs, said bearing elements defining an upper surface of said B-surface seat occupancy sensor unit, which said top surface of said support plate is arranged recessed from;
a first foam pad disposed between said bearing elements on said support plate;
a recess formed in said top surface of said support plate, underneath said first foam pad;
a second foam pad arranged in said recess;
a pressure-responsive membrane switch arranged in said recess on said second foam pad, said pressure-responsive membrane switch comprising a first carrier film and a second carrier film spaced from each other by a spacer film, said spacer film having therein an opening defining a cell, said pressure-responsive membrane switch comprising at least two electrodes arranged in facing relationship with each other in said cell on said first and said second carrier film, respectively, in such a way that they are brought closer together, possibly into contact with each other, when pressure is applied on said pressure-responsive membrane switch;
wherein said recess has a depth exceeding the total height of said pressure-responsive membrane switch and said second foam pad; and
wherein said pressure-sensitive membrane switch projects laterally beyond a first edge of said second foam pad and beyond a second edge of said second foam pad, opposite said first edge;
wherein said B-surface seat occupancy sensor unit rests on said cushion-supporting springs and is applied by said cushion-supporting springs against a bottom surface of said seat cushion.

6. The vehicle seat as claimed in claim 5, wherein said bearing elements are integrally formed with said support plate.

7. The vehicle seat as claimed in claim 6, wherein said support plate and said bearing elements are made of injection-molded plastic.

8. The vehicle seat as claimed in claim 5, wherein said first foam pad is configured such that, upon it being compressed by application of pressure exceeding a certain threshold, it deforms so as to penetrate into said recess, contacts said pressure-responsive membrane switch, and, together with said second foam pad, squeezes said pressure-responsive membrane switch so as to activate it.

9. A B-surface seat occupancy sensor unit for detecting an occupancy state of a seat comprising:
a support plate having a top surface and a bottom surface,
a plurality of spacer elements defining an upper surface of said B-surface seat occupancy sensor unit from which upper surface said top surface of said support plate is arranged recessed from;
a first foam pad disposed between said spacer elements, carried by said support plate;
a recess formed in said top surface of said support plate, underneath said first foam pad;
a second foam pad arranged in said recess
a pressure-responsive membrane switch arranged in said recess on said second foam pad, said pressure-responsive membrane switch comprising a first carrier film and a second carrier film spaced from each other by a spacer film, said spacer film having therein an opening defining a cell, said pressure-responsive membrane switch comprising at least two electrodes arranged in facing relationship with each other in said cell on said first and said second carrier film, respectively, in such a way that they are brought closer together, possibly into contact with each other, when pressure is applied on said pressure-responsive membrane switch;
wherein said recess has a depth exceeding the total height of said pressure-responsive membrane switch and said second foam pad; and
wherein said pressure-sensitive membrane switch projects laterally beyond a first edge of said second foam pad and beyond a second edge of said second foam pad, opposite said first edge.

10. The B-surface seat occupancy sensor unit as claimed in claim 9, wherein said spacer elements are integrally formed with said support plate.

11. The B-surface seat occupancy sensor unit as claimed in claim 10, wherein said support plate and said spacer elements are made of injection-molded plastic.

12. The B-surface seat occupancy sensor unit as claimed in claim 9, wherein said first foam pad is configured such that, upon it being compressed by application of pressure exceeding a certain threshold, it deforms so as to penetrate into said recess, contacts said pressure-responsive membrane switch, and, together with said second foam pad, squeezes said pressure-responsive membrane switch so as to activate it.

13. A vehicle seat, comprising a seat cushion supported by a cushion-supporting pan and a B-surface seat occupancy sensor unit for detecting an occupancy state of a seat, said B-surface seat occupancy sensor unit comprising:
a support plate having a top surface and a bottom surface,
a plurality of spacer elements defining an upper surface of said B-surface seat occupancy sensor unit from which upper surface said top surface of said support plate is arranged recessed from;
a first foam pad disposed between said spacer elements, carried by said support plate;
a recess formed in said top surface of said support plate, underneath said first foam pad;
a second foam pad arranged in said recess;
a pressure-responsive membrane switch arranged in said recess on said second foam pad, said pressure-responsive membrane switch comprising a first carrier film and a second carrier film spaced from each other by a spacer film, said spacer film having therein an opening defining a cell, said pressure-responsive membrane switch comprising at least two electrodes arranged in facing relationship with each other in said cell on said first and said second carrier film, respectively, in such a way that they are brought closer together, possibly into contact with each other, when pressure is applied on said pressure-responsive membrane switch;
wherein said recess has a depth exceeding the total height of said pressure-responsive membrane switch and said second foam pad; and
wherein said pressure-sensitive membrane switch projects laterally beyond a first edge of said second foam pad and beyond a second edge of said second foam pad, opposite said first edge, wherein said B-surface seat occupancy sensor unit rests on said cushion-supporting pan and is applied by said cushion-supporting pan against a bottom surface of said seat cushion.

14. The vehicle seat as claimed in claim 13, wherein said spacer elements are integrally formed with said support plate.

15. The vehicle seat as claimed in claim 14, wherein said support plate and said spacer elements are made of injection-molded plastic.

16. The vehicle seat as claimed in claim 13, wherein said first foam pad is configured such that, upon it being compressed by application of pressure exceeding a certain threshold, it deforms so as to penetrate into said recess, contacts said pressure-responsive membrane switch, and, together with said second foam pad, squeezes said pressure-responsive membrane switch so as to activate it.

* * * * *